United States Patent
Zeo et al.

(10) Patent No.: US 11,897,545 B2
(45) Date of Patent: Feb. 13, 2024

(54) VEHICLE BODY ROOF REGION AND METHOD FOR FASTENING A ROOF SURFACE PART TO A ROOF BODY STRUCTURE

(71) Applicant: BOS GmbH & Co. KG, Ostfildern (DE)

(72) Inventors: Gwenole Zeo, Ostfildern (DE); Sven Ahrens, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 17/710,105

(22) Filed: Mar. 31, 2022

(65) Prior Publication Data
US 2022/0315122 A1 Oct. 6, 2022

(30) Foreign Application Priority Data
Apr. 1, 2021 (DE) .......................... 102021203366.0

(51) Int. Cl.
*B62D 25/06* (2006.01)
*B62D 27/02* (2006.01)

(52) U.S. Cl.
CPC .......... *B62D 25/06* (2013.01); *B62D 27/026* (2013.01)

(58) Field of Classification Search
CPC .............................. B62D 25/06; B62D 27/026
USPC ............................................ 296/216.01, 215
See application file for complete search history.

(56) References Cited

U.S. PATENT DOCUMENTS

| 4,826,239 | A | 5/1989 | Nishikawa et al. | |
|---|---|---|---|---|
| 6,672,655 | B2 * | 1/2004 | Zinsmeister | B62D 25/06 296/191 |
| 8,727,430 | B2 * | 5/2014 | Schroferl | B60J 7/0084 296/213 |
| 8,807,638 | B2 * | 8/2014 | Schroferl | B62D 25/07 296/213 |
| 8,833,843 | B2 | 9/2014 | Stark et al. | |
| 2003/0011213 | A1 | 1/2003 | Zinsmeister et al. | |

(Continued)

FOREIGN PATENT DOCUMENTS

| CN | 102950997 A | 3/2013 |
|---|---|---|
| DE | 3727413 A1 | 2/1988 |

(Continued)

OTHER PUBLICATIONS

Chinese Office Action issued in corresponding Chinese Application No. 202210338525.0 dated Jun. 9, 2023 (7 pages).

*Primary Examiner* — Dennis H Pedder
(74) *Attorney, Agent, or Firm* — FLYNN THIEL, P.C.

(57) ABSTRACT

Vehicle body roof region and method for fastening a roof surface part to a roof body structure.
A vehicle body roof region having a roof body structure and having a roof surface part which is fixedly connected to the roof body structure and which is designed as a glass roof part, which is provided to be adhesively bonded to the roof body structure, is known.
According to the invention a mechanical adjusting device which is arranged between the glass roof part and the roof body structure is provided, said adjusting device being ready, after the glass roof part is positioned and before the adhesive bonding has cured, to permit an adjustment of the glass roof part relative to an outer skin of the roof body structure before the adhesive bonding has cured.
Use in passenger motor vehicles.

17 Claims, 9 Drawing Sheets

(56) References Cited

U.S. PATENT DOCUMENTS

2013/0038091 A1    2/2013   Schröferl
2013/0187413 A1    7/2013   Schröferl
2017/0320524 A1   11/2017   Degaugue

FOREIGN PATENT DOCUMENTS

| DE | 202004020443 U1 * | 8/2005 | ............ B60J 10/30 |
| --- | --- | --- | --- |
| DE | 102005044283 A1 * | 4/2007 | ............ B62D 25/06 |
| DE | 102014010420 A1 | 1/2016 | |
| DE | 102015103814 A1 | 9/2016 | |
| DE | 102017110128 A1 | 11/2018 | |
| DE | 102017120028 A1 * | 2/2019 | |
| EP | 1088746 A2 * | 4/2001 | ............ B60J 7/022 |
| EP | 3771579 A1 | 2/2021 | |
| WO | 2012123368 A1 | 9/2012 | |
| WO | WO-2021008728 A1 * | 1/2021 | ............ B62D 25/06 |

\* cited by examiner

VEHICLE BODY ROOF REGION AND METHOD FOR FASTENING A ROOF SURFACE PART TO A ROOF BODY STRUCTURE

CROSS-REFERENCE TO RELATED APPLICATION

This claims priority from German Application No. 10 2021 203 366.0, filed Apr. 1, 2021, the disclosure of which is hereby incorporated by reference in its entirety.

TECHNICAL FIELD

The invention relates to a vehicle body roof region, having a roof body structure and having a roof surface part which is fixedly connected to the roof body structure, wherein the roof surface part is designed as a glass roof part which is provided to be adhesively bonded to the roof body structure. The invention further relates to a method for fastening a roof surface part to a roof body structure by adhesive bonding.

BACKGROUND AND SUMMARY

Vehicle body roof regions in passenger motor vehicles are generally known. Such a vehicle body roof region has a roof body structure which in the fully mounted state is connected to a body shell of the passenger motor vehicle. In order to achieve a closed roof upper face, a roof surface part is positioned onto the roof body structure and fixedly connected to the roof body structure. Such roof surface parts may be designed as sheet metal parts, as plastics parts or as glass parts. A corresponding roof surface part is connected by a material connection to the roof body structure.

It is the object to provide a vehicle body roof structure and a method of the type mentioned in the introduction, which improve the driving comfort for vehicle occupants.

This object is achieved for the vehicle body roof region in that a mechanical adjusting device which is arranged between the glass roof part and the roof body structure is provided, said adjusting device being ready, after the glass roof part is positioned and before the adhesive bonding has cured, to permit an adjustment of the glass roof part relative to an outer skin of the roof body structure while the adhesive bonding is curing. The design of the roof surface part as a glass roof part improves the brightness in a vehicle interior. As the roof surface part is able to be accurately adapted relative to an outer skin of the roof body structure by means of the mechanical adjusting device, wind noise which is produced by driving wind flowing around the region of the body outer skin is reduced during the subsequent operation of the vehicle. Both aspects increase the driving comfort for the vehicle occupants in a vehicle interior of the vehicle. The adjusting device permits an adjustment in at least one spatial axis, advantageously along all three spatial axes, of a spatial coordinate system in the vehicle. The vehicle body roof region according to the invention is particularly advantageously used in the field of passenger motor vehicles. The vehicle body roof region, however, may also be used in other motor vehicles in the form of trucks or utility vehicles. The mechanical adjusting device is used as soon as the glass roof part is positioned onto the roof body structure, preferably together with correspondingly applied adhesive beads, and before the adhesive has cured. As a result, it is advantageously possible to set the roof surface part accurately relative to the outer skin of the roof body structure. After the curing of the adhesive for the adhesive bonding, the adjustment which has been set is inevitably fixed. However, in order to increase the reliability of the adjusting position which has been accurately set, an additional mechanical securing arrangement may be provided in order to fix the adjustment even before the curing has taken place. Adjusting elements of the adjusting device are connected directly or indirectly to the glass roof part. A direct connection is advantageously understood to mean an adhesive bonding of at least one adjusting element to a lower face of the glass roof part. An indirect connection is preferably understood to mean a fastening of the adjusting element to an intermediate part which is fastened by adhesive bonding to the lower face of the glass roof part.

In one embodiment of the invention, adjusting elements of the adjusting device which are provided on the glass roof part are retained in a dimensionally stable plastics foam cladding. During the production of the foam cladding of the glass roof part, therefore, the adjusting elements assigned to the glass roof part are already foamed therein. A PU foam cladding is preferably provided as a dimensionally stable plastics foam cladding. The corresponding plastics foam cladding permits the fastening of retaining parts or supporting parts as well as corresponding adjusting elements to the glass roof part, without the glass roof part itself having to be treated. This also represents an indirect connection of the adjusting elements to the glass roof part.

In a further embodiment of the invention, adjusting elements which are provided on the roof body structure are retained on integrally formed retaining portions of the roof body structure. The roof body structure is advantageously designed as a sheet metal structure. The retaining portions are integral components of this sheet metal structure. Alternatively, the roof body structure may be produced from different materials, such as in particular from plastics materials or fiber-reinforced plastics. Even with such materials, the retaining portions are already taken into account during the production of such roof body structures and integrally formed from the corresponding materials or integrally connected thereto.

In a further embodiment of the invention, movable adjusting elements which are designed as adjusting spindle elements are provided. These adjusting elements permit a linear displacement in the path of a screw spindle function, at least substantially at right angles to a corresponding surface of the glass roof part.

In a further embodiment of the invention, the adjusting spindle elements have tool contact surfaces, a displacement of the adjusting spindle elements being made possible thereby. For a corresponding adjustment, a tool which is operated by a robot or by a human operator acts on the tool contact surfaces.

In a further embodiment of the invention, the adjusting spindle elements are retained so as to be able to be screwed into and screwed out of fixed threaded sleeves which are fixedly arranged on the glass roof part or on the roof body structure. The fixed arrangement on the glass roof part is understood to mean a fastening in the region of the plastics foam cladding or even an adhesively bonded material connection to a lower face of the glass roof part. The threaded sleeves have internal threads which are adapted to complementary external threads of the adjusting spindle elements.

In a further embodiment of the invention, the adjusting spindle elements and the threaded sleeves have self-locking threads. This embodiment is advantageous since, once the adjusting positions are set, these positions may no longer be displaced due to the inherent weight of the glass roof part which bears against the roof body structure, or due to other applied forces.

In a further embodiment, the adjusting device is assigned a securing arrangement which, after the adjustment has taken place, carries out a fixing of the corresponding adjusting positions of the adjusting elements. This embodiment is particularly advantageous for adjusting spindle elements and complementary threaded sleeves which are not provided with self-locking threads. Non-self-locking threads permit a more rapid linear displacement since they have larger thread pitches, so that slight rotations already bring about a considerable lift. The securing arrangement is preferably mechanically designed and, in particular, may have locking nuts which fix the adjusting spindle elements relative to the threaded sleeves.

For the method mentioned in the introduction, the object underlying the invention is achieved in that the roof surface part is positioned onto the roof body structure, and in that after an adhesive has been applied and before the adhesive has cured, an adjustment of a surface of the roof surface part relative to an outer skin of the roof body structure and a subsequent fixing of the adjustment are carried out. In the method according to the invention, advantageously the additional adjusting step is chronologically integrated in the curing time, so that in spite of the presence of an additional adjusting step for the adjustment, no additional time is required during the production of the vehicle body roof structure. An adjustment may be carried out along at least one axis of a spatial coordinate system. Preferably, an adjustment is provided in the direction of all three axes of the spatial coordinate system.

Further advantages and features of the invention emerge from the claims and from the following description of preferred exemplary embodiments of the invention which are shown with reference to the drawings.

DETAILED DESCRIPTION

Figure 1:
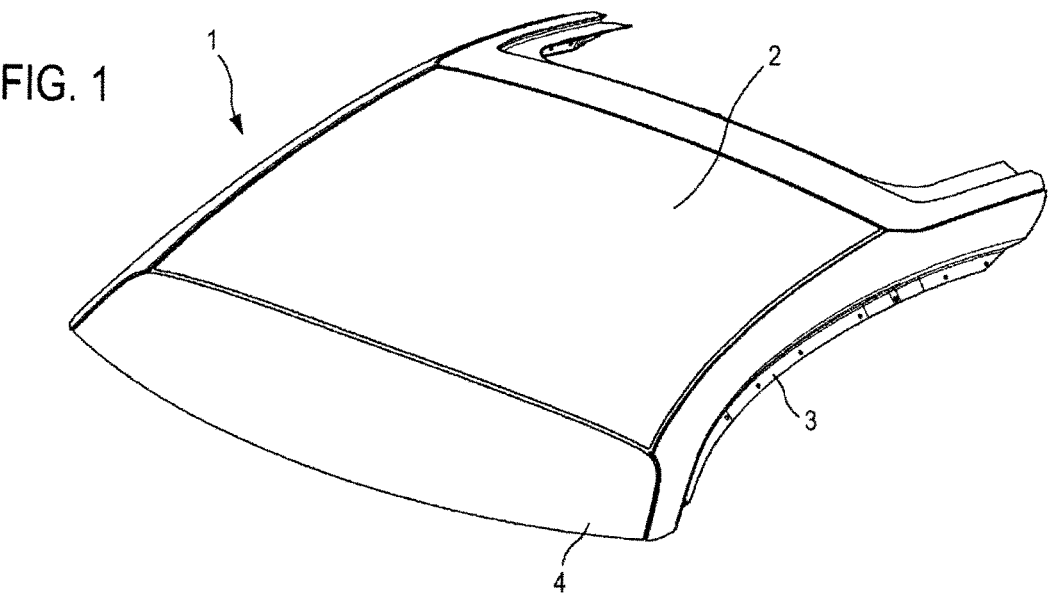
FIG. 1 shows in a perspective view an embodiment of a vehicle body roof region.

A vehicle body roof region 1 according to FIG. 1 is part of a vehicle body of a passenger motor vehicle. The vehicle body roof region 1 has a roof body structure 3 which has a body shell and body surface parts which are applied to the body shell structure and which form parts of a body outer skin of the vehicle body. The vehicle body roof region 1 according to FIG. 1 additionally has a roof surface part, in the present case in the form of a glass roof part 2, which extends over approximately an entire width and approximately an entire length of the vehicle body roof region. The glass roof part 2 adjoins a windshield 4 on the front side. On opposing longitudinal sides the glass roof part 2 adjoins corresponding lateral body surface parts of the vehicle body structure so as to be aligned therewith, the outer surfaces thereof defining corresponding portions of the body outer skin A. The glass roof part 2 also adjoins a rear body surface part so as to be flush therewith, said rear body surface part surrounding a rear window, not shown, and also being fixedly connected to the roof body structure 3.

Figure 2:
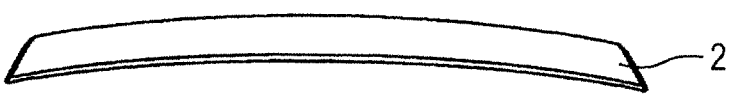
FIG. 2 shows in a front view a roof surface part designed as a glass roof part for the vehicle body roof region according to Fig. 1.
Figure 3:
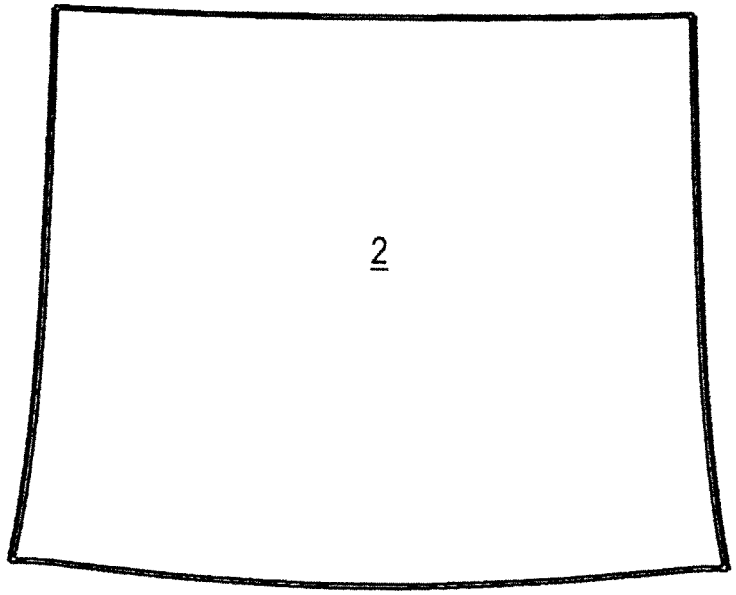
FIG. 3 shows a view from above of the glass roof part according to FIG. 2.
Figure 4:
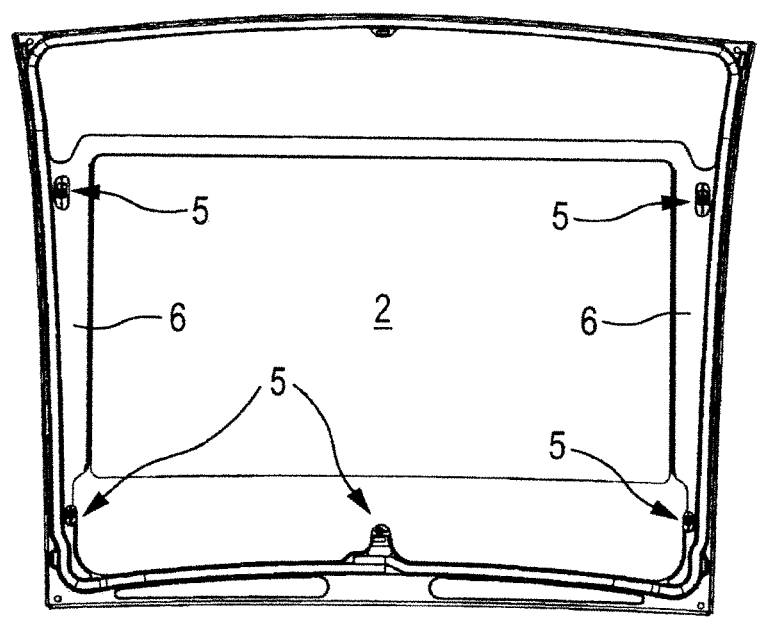
FIG. 4 shows a view from below of the glass roof part according to FIGS. 2 and 3.
Figure 5:
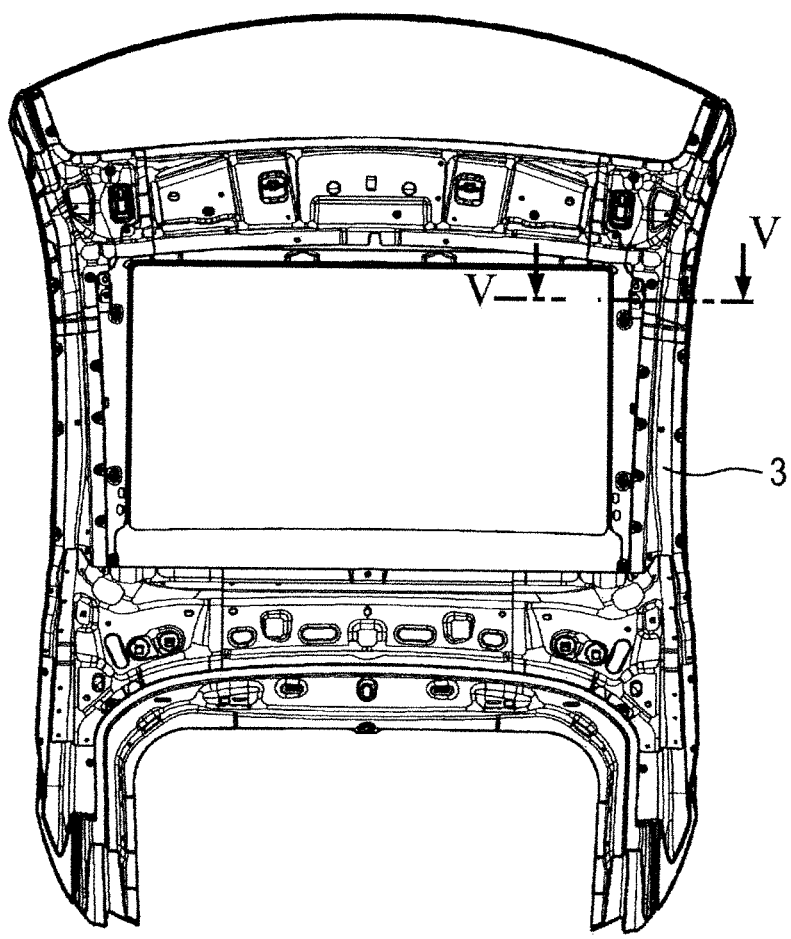
FIG. 5 shows a plan view of a roof body structure of the vehicle body roof region according to FIG. 1.

The fitting and fastening of the glass roof part 2 between the adjacent body surface parts and on the roof body structure 3 is described in more detail hereinafter with reference to FIGS. 2 to 10. FIGS. 2 to 4 show in different views the glass roof part 2 which is provided on its lower face (FIG. 4) with adjusting elements 5 of an adjusting device which are embedded in a dimensionally stable PU foam cladding, in order to fix the adjusting elements 5 relative to the lower face of the glass roof part 2. In FIG. 5 the roof body structure 3 may be identified without the positioned lateral or rear body surface parts. In this case, the roof body structure 3 is shown such that a recess is arranged at the top in the drawing plane for the front windshield and a recess is arranged at the bottom in the drawing plane for positioning a rear window. The roof body structure 3 has in the roof region itself a square-shaped cutout which in the fully mounted state is closed by the glass roof part 2.

In order to be able to adjust the glass roof part 2 so as to be aligned flush relative to the roof body structure 3 and, in particular, relative to the lateral and rear body surface parts of the body outer skin A, an adjusting device which has a total of five adjustment points 5 is provided, as may be derived from FIGS. 4 and 5. One of these adjustment points is described in more detail with reference to the enlarged sectional views according to FIGS. 6 to 8. The same applies in terms of function to the other adjustment points 5, so that in this regard no repetition is required. With reference to FIG. 5 the position of the adjustment point 5, which is shown enlarged with reference to FIGS. 6 to 8, may be identified in the region of the roof body structure 3.

Figure 6:
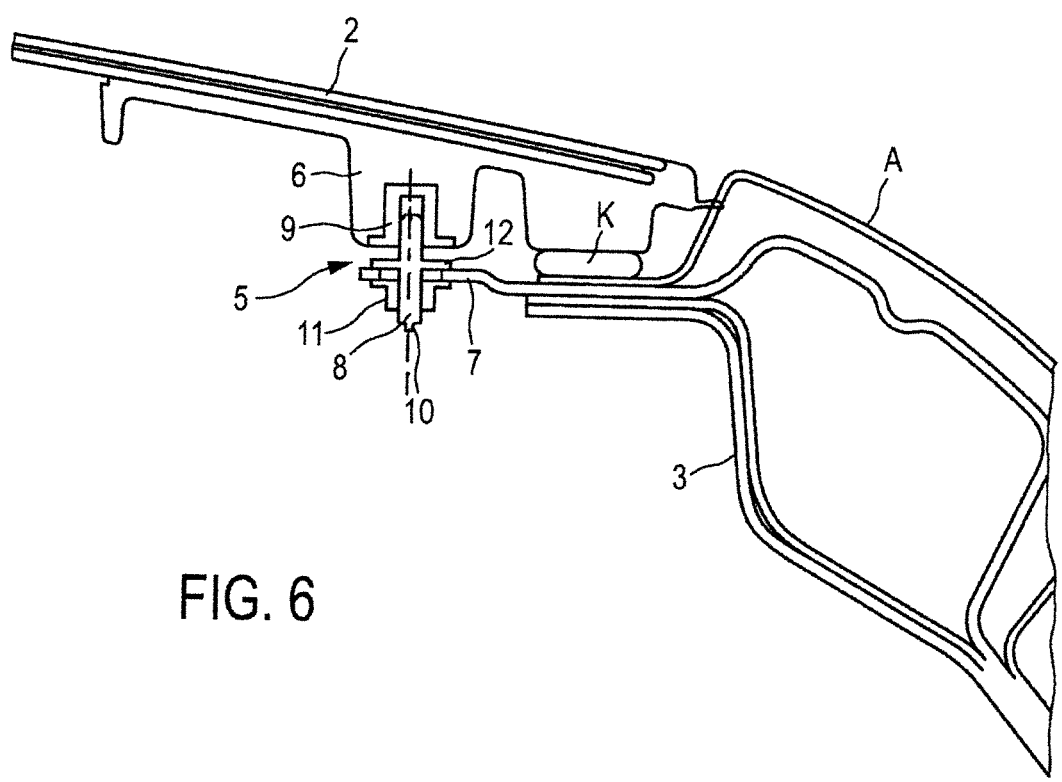
FIG. 6 shows as section through the vehicle body roof region along the cutting line V-V in FIG. 5 but with the positioned glass roof part.
Figure 7:
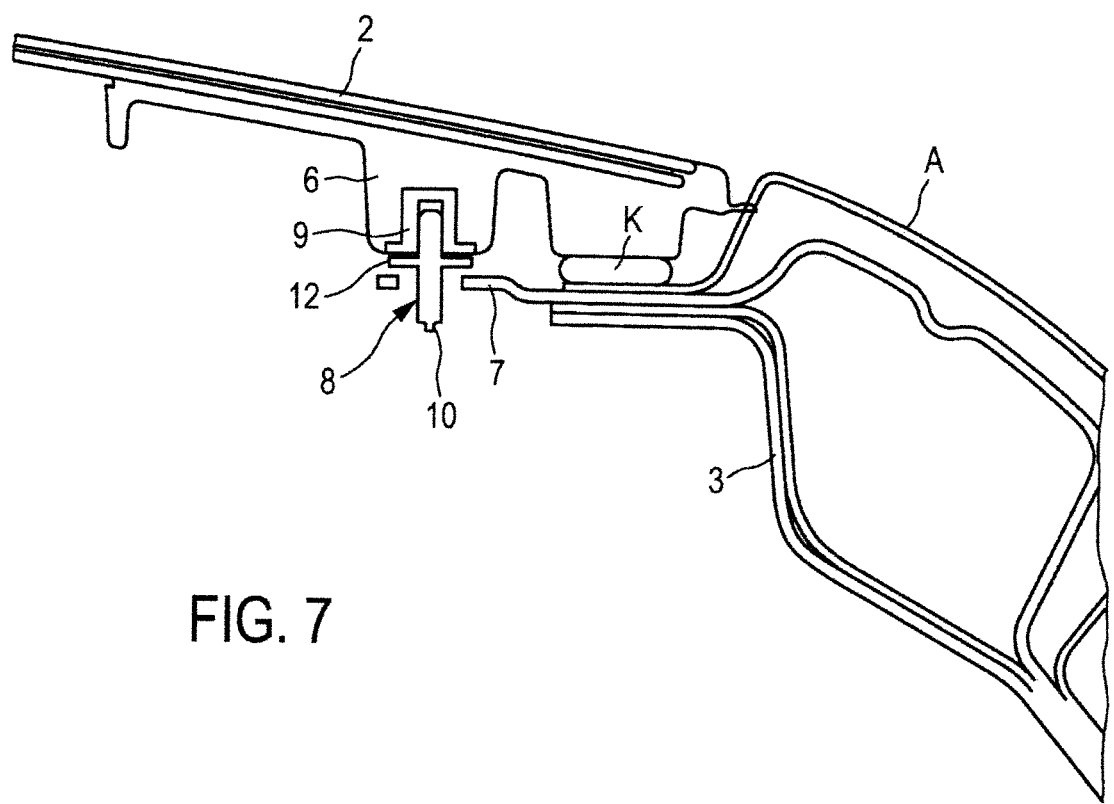
FIGS. 7 and 8 show two different adjusting positions for the glass roof part relative to the roof body structure in a sectional view according to Fig. 6.
Figure 8:
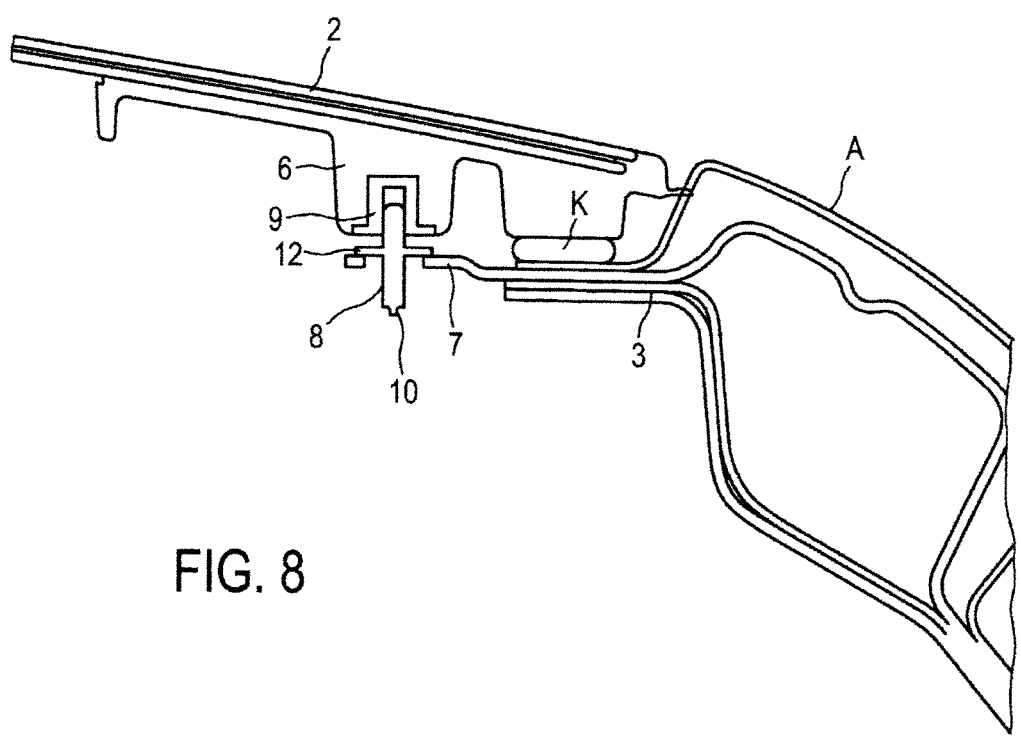

As may be derived from FIGS. 6 to 8 an adjusting element 9 which is fixed to the glass roof part 2 and which is configured in the manner of a threaded sleeve is inserted into the dimensionally stable PU foam cladding 6 in the region of the lower face of the glass roof part 2. A central longitudinal axis of an internal thread of this threaded sleeve extends in the vehicle vertical direction, as may be derived from the thin dashed-dotted line in FIGS. 6 to 8.

An adjusting spindle 8 is screwed into this threaded sleeve, said adjusting spindle being provided with a support plate 12 which is integrally formed and which protrudes radially to the central longitudinal axis of the adjusting spindle 8.

The roof body structure 3 has a retaining flange 7 provided with a through-passage. In the positioned state of the glass roof part 2, the support plate 12 is supported on an upper face of an edge of the through-passage of this retaining flange 7, as may be derived from FIG. 8. The adjusting spindle 8 has an external thread which is designed in a complementary manner to the internal thread of the threaded sleeve 9. The internal thread and the external thread are designed to be self-locking. The adjusting spindle 8 has a cylindrical shape and is provided with the corresponding external thread over approximately its entire length (with the exception of the support plate 12). The adjusting spindle 8 is provided with tool contact surfaces 10 in the region of a lower face, on an end of the spindle 8 opposite the threaded end which is screwed into the threaded sleeve 9.

As may be identified in FIGS. 6 to 8 the through-passage of the retaining flange 7 is substantially larger than a diameter of the adjusting spindle 8. The support plate 12, however, has a diameter which is substantially larger than the diameter of the through-passage of the retaining flange 7. As a result, it is possible to adjust the support plate and thus, in the screwed-in state of the adjusting spindle 8 into the threaded sleeve 9, also the glass roof part 2 as a whole in a horizontal plane which is spanned by a vehicle transverse direction and a vehicle longitudinal direction. By the corresponding screwing in or screwing out of the adjusting spindle 8 relative to the threaded sleeve 9, the glass roof part 2 is additionally adjustable in the vehicle vertical direction relative to the retaining flange 7 and thus relative to the roof body structure 3.

The adjusting device and thus each adjustment point 5 are additionally assigned fixing elements 11 which serve as a securing arrangement and which in the present case are designed as securing nuts 11 which are able to be screwed onto the lower region of each adjusting spindle 8. The corresponding securing nut 11 is screwed from below onto the external thread of the adjusting spindle 8 until the securing nut 11 is pressed against a lower face of the edge of the through-passage of the retaining flange 7. As a result, the support plate 12 is also inevitably pulled downwardly from the top of the through-passage so that the adjusting spindle 8 is clamped relative to the retaining flange 7.

As may also be derived clearly from FIGS. 6 to 8, the actual fixing of the glass roof part 2 takes place relative to the roof body structure 3 by adhesive bonding, by means of an adhesive bead K which is provided over the periphery between a lower face of the PU foam cladding 6 of the glass roof part 2 and a peripheral supporting edge of the roof body structure 3.

The mounting of the glass roof part 2 relative to the roof body structure 3 takes place as follows:

The glass roof part 2 is prepared in the region of the lower face thereof such that the respective adjusting spindle 8 is screwed into the respective threaded sleeve 9, as may be identified in FIG. 7. Now an adhesive bead K is applied to the peripheral supporting edge of the PU foam cladding 6 in the region of the lower face of the glass roof part 2. The glass roof part 2 is then positioned from above, with the adhesive bead K and the screwed-in adjusting spindles 8, onto the roof body structure 3 so that the adjusting spindles 8 protrude from above through the through-passages of the retaining flange 7 and the support plates 12 bear against the upper face of the edge of the respective through-passage of the retaining flange 7. The inherent weight of the glass roof part 2 compresses the adhesive bead K which has not yet cured. The described processes, such as the application of the adhesive bead and the positioning of the glass roof part 2 onto the roof body structure 3, are carried out by a suitable robot in the region of an assembly line of a production facility for passenger motor vehicles. The curing of the adhesive of the adhesive bead K requires some time. This time is used in order to carry out the adjustment of the glass roof part 2 both in the vertical direction and in the transverse direction, and in the longitudinal direction relative to the adjacent body surface parts of the body outer skin A. These adjustment tasks may also be undertaken by a robot, which may easily monitor the orientation of the glass roof part 2 relative to the adjacent body surface parts. In order to achieve an adaptation of an upper face of the glass roof part 2, which is flush and aligned with a surface of the body outer skin A, the adjusting spindle 8 is accordingly displaced in the vertical direction relative to the respective threaded sleeve 9 in the region of each adjustment point 5. In order to achieve uniform spacings and thus uniform gap sizes between the glass roof part 2 and the adjacent edge surfaces of the lateral and rear body surface parts, a corresponding adjustment of the glass roof part 2 is additionally carried out in the longitudinal and transverse direction. As soon as the desired adjustment is achieved, the securing nuts 11 are screwed onto the adjusting spindles 8 from below so that the adjustment which has been set is fixed in the region of each adjustment point 5. In the meantime, the adhesive of the adhesive bead K has also cured so that the mounting of the glass roof part 2 onto the roof body structure 3 is completed.

Figure 9:
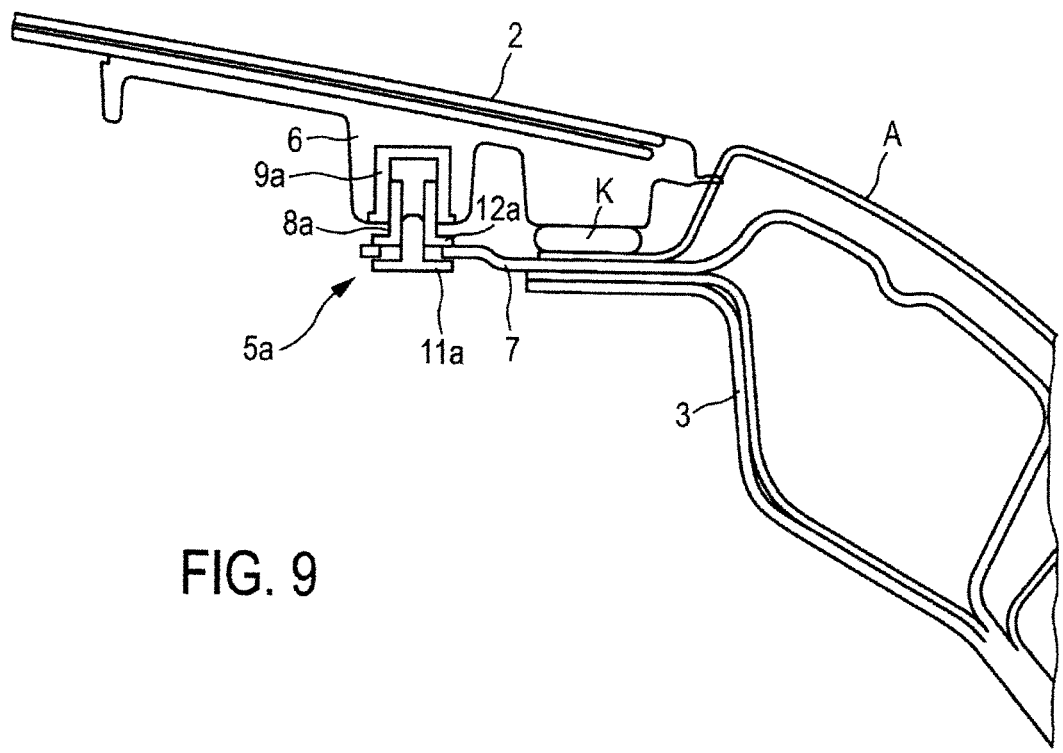
FIG. 9 shows a sectional view similar to FIG. 6 of a further embodiment of a vehicle body roof region.
Figure 10:
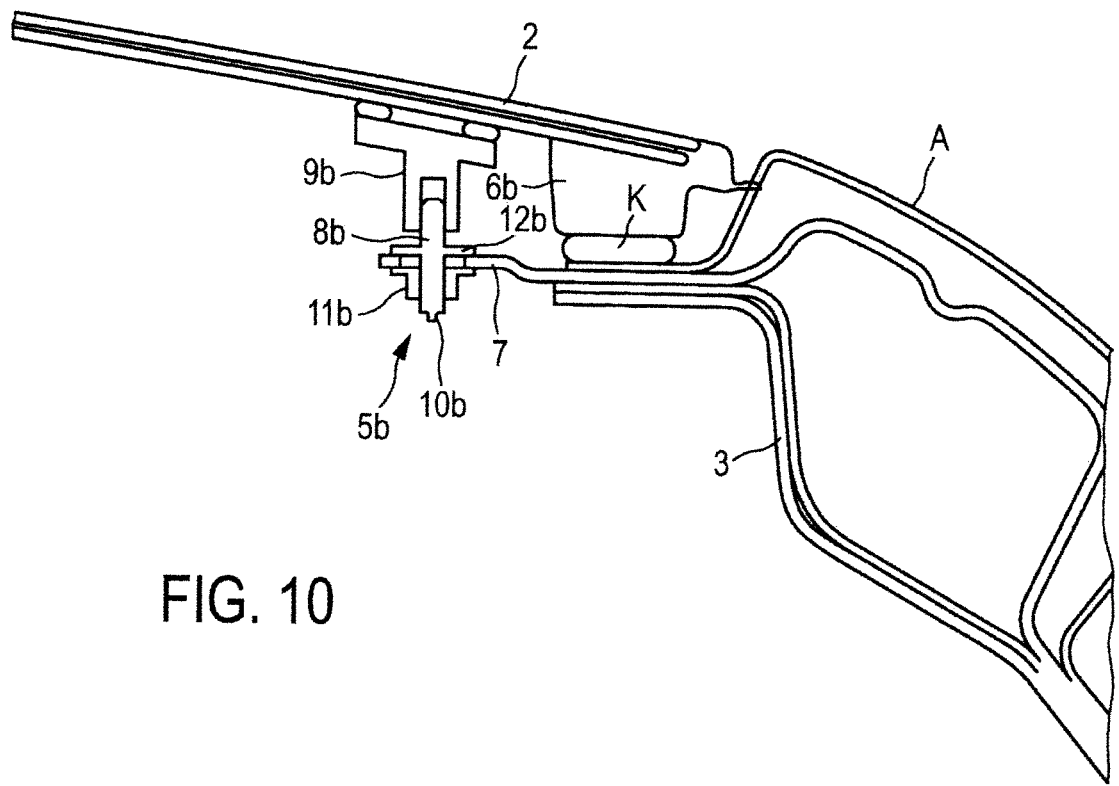
FIG. 10 shows a sectional view similar to FIG. 6 of a further embodiment of a vehicle body roof region.

Embodiments which are provided with a slightly different adjusting device are shown with reference to FIGS. 9 and 10. In this case, components and portions of the vehicle body roof region which are identical are provided with the same reference numerals. Since in detail, however, the adjusting device is designed differently in both embodiments, the adjustment points are provided with the same reference numerals but with the addition of the letters a or b, in a similar manner to the assigned adjustment and securing elements of the respective adjustment point 5*a*, 5*b*.

As may be identified in FIG. 9, an adjusting element in the form of a threaded sleeve 9*a* is provided here with a larger internal diameter for a corresponding internal thread than is the case in the embodiment according to FIGS. 6 to 8. The adjusting spindle 8*a* is designed to be hollow-cylindrical and open both toward an upper face and toward a lower face. A lower front edge of the adjusting spindle 8*a* forms the support plate 12*a*. The hollow space of the adjusting spindle 8*a* is provided at least in some sections with an internal thread into which a securing element in the form of a securing screw 11*a* is able to be screwed from below. The securing screw 11*a* has a plate-shaped supporting head which is supported by a lower face against the edge of the through-passage of the retaining flange 7. A mounting and adjustment sequence in the embodiment according to FIG. 9 is identical to the mounting and adjustment sequence which has been described above with reference to FIGS. 6 to 8. It is also the case here that the adjustment and the securing of this adjustment is completed before the adhesive of the adhesive bead K has cured.

The embodiment according to FIG. 10 differs from the embodiment according to FIGS. 6 to 8 in that the adjusting element 9*b* which is designed as a threaded sleeve is not embedded in the PU foam cladding 6*b* but instead is designed as a separate component which is connected by an adhesively bonded material connection to the lower face of the glass roof part 2. The adjusting element 9*b* is fastened to the lower face of the glass roof part 2 before the adhesive bead K is applied to the PU foam cladding 6*b*. The adjusting spindle 8*b* and the securing nut 11*b* and the retaining flange 7 are designed identically to the embodiment according to FIGS. 6 to 8 so that, in order to avoid repetition, reference is made to the description of the embodiment according to FIGS. 6 to 8.

The invention claimed is:

1. A vehicle body roof region, comprising a roof body structure and a roof surface part fixedly connected to the roof body structure, the roof surface part comprising a glass roof part having a lower surface and being fixed to the roof body structure by a cured adhesive connection, the vehicle body roof region further comprising a mechanical adjusting arrangement including a plurality of first adjusting elements disposed between the glass roof part and the roof body structure and being fixed to the lower surface of the glass roof part in spaced-apart relation with one another adjacent outer edge regions of the glass roof part, and a plurality of second adjusting elements each movably engaged with one of the first adjusting elements to permit adjustment of at least a vertical distance between the glass roof part and the roof body structure to position the glass roof part in a selected one of a plurality of vertical positions relative to the roof body structure and relative to an outer skin of the roof body structure, the cured adhesive connection fixing the glass roof part in the selected one of the plurality of vertical positions, the roof body structure including a plurality of retaining elements disposed adjacent the lower surface of the glass roof part, each of the retaining elements having an upper side disposed in facing relation with the lower surface of the glass roof part each of the second adjusting elements being supported on one of the retaining elements of the roof body structure on the upper side thereof, and the mechanical adjusting arrangement is configured to permit positional adjustment of the glass roof part relative to the roof body structure and the outer skin thereof in a substantially horizontal direction.

2. The vehicle body roof region as claimed in claim 1, further comprising a plastics foam cladding fixed to the glass roof part, the first adjusting elements being fixedly retained in the plastics foam cladding.

3. The vehicle body roof region as claimed in claim 1, wherein each of the first adjusting elements comprises a sleeve element and each of the second adjusting elements comprises a spindle element movably engaged with the sleeve element of the one first adjusting element.

4. The vehicle body roof region as claimed in claim 3, wherein each spindle element includes a first outer portion configured to permit manipulation of the spindle element and disposed on a lower side of the corresponding retaining element and a second inner portion disposed between the upper side of the corresponding retaining element and the lower surface of the glass roof part, the second inner portion including a support plate supported on the upper side of the corresponding retaining element and a threaded part threadingly engaged within the sleeve element of the one first adjusting element.

5. The vehicle body roof region as claimed in claim 4, wherein each of the retaining elements defines a through-hole therein, the support plate of each spindle element has an outer periphery with a dimension greater than a diameter of the through-hole, the first outer portion of each spindle element extends downwardly from the respective support plate and through the through-hole of the corresponding retaining element, the support plate of each spindle element having an outer edge region supportively engaged with an inner periphery of the corresponding retaining element defining the through-hole thereof,--- the threaded part of the second inner portion of each spindle element extends upwardly from the respective support plate and is threadingly engaged within the sleeve element of the corresponding second adjusting element, and each spindle element is movable relative to the corresponding retaining element in the substantially horizontal direction to permit positional adjustment of the glass roof part relative to the roof body structure and the outer skin thereof in the substantially horizontal direction.

6. A vehicle body roof region, comprising a roof body structure and a roof surface part fixedly connected to the roof body structure, the roof surface part comprising a glass roof part fixed to the roof body structure by a cured adhesive connection, the vehicle body roof region further comprising a plastics foam cladding fixed to the glass roof part and a mechanical adjusting arrangement, the mechanical adjusting arrangement including a plurality of first adjusting elements fixedly retained in the plastics foam cladding and disposed on the glass roof part between the glass roof part and the roof body structure, and a plurality of second adjusting elements each movably engaged with one of the first adjusting elements, the plurality of first and second adjusting elements being configured to permit adjustment of at least a vertical distance between the glass roof part and the roof body structure to position the glass roof part in a selected one of a plurality of vertical positions relative to the roof body structure and relative to an outer skin of the roof body structure, the cured adhesive connection fixing the glass roof part in the selected one of the plurality of vertical positions, the roof body structure comprising integrally-formed retaining portions, each of the second adjusting elements being retained on one of the retaining portions of the roof body structure, and each of the second adjusting elements including a portion disposed vertically between the glass roof part and an upper side of the corresponding retaining portion facing the glass roof part, the portion of each of the second adjusting elements having a surface disposed in opposed and facing relation with the upper side.

7. The vehicle body roof region as claimed in claim 6, wherein each of the second adjusting elements comprises a movable spindle element, each movable spindle element being engaged with the one first adjusting element and being positionally adjustable relative thereto.

8. The vehicle body roof region as claimed in claim 7, wherein each of the movable spindle elements includes a tool contact face configured to permit displacement of the movable spindle element relative to the one first adjusting element.

9. The vehicle body roof region as claimed in claim 7, wherein each of the first adjusting elements includes a sleeve with a threaded portion and each of the movable spindle elements has a threaded portion threadingly engaged with the threaded portion of the threaded sleeve of the one first adjusting element.

10. The vehicle body roof region as claimed in claim 9, wherein the threaded portions of the movable spindle elements and the threaded sleeves have self-locking threads.

11. The vehicle body roof region as claimed in claim 6, wherein the mechanical adjusting arrangement is additionally configured to permit adjustment of a horizontal position of the glass roof part relative to the roof body structure and the outer skin thereof.

12. The vehicle body roof region as claimed in claim 6, wherein the mechanical adjusting arrangement comprises a securing arrangement cooperating with the first and second adjusting elements to fix the glass roof part in the selected one of the plurality of vertical positions before curing of the adhesive connection.

13. A vehicle body roof region comprising:
a glass roof part having an inner side and an outer side facing away from said inner side;
a roof body structure including an outer skin and at least one retaining portion disposed adjacent said inner side of said glass roof part, said at least one retaining portion having a side disposed in facing relation with said inner side of said glass roof part;

a mechanical adjusting arrangement configured for adjusting a position of said glass roof part relative said roof body structure and said outer skin thereof, said mechanical adjusting arrangement comprising:

at least one first adjusting element fixed to said glass roof part adjacent said inner side thereof; and at least one second adjusting element supported on said roof body structure and engaged with said at least one first adjusting element, said at least one second adjusting element having a portion supported on said at least one retaining portion of said roof body structure on said side thereof in facing relation with said inner side of said glass roof part, and one of said first or second adjusting elements being movably positionally adjustable relative to the other said first or second adjusting element to adjust a position of said glass roof part relative to said roof body structure and said outer skin thereof, said portion of said at least one second adjusting element maintaining said glass roof part in a selected position relative to said roof body structure and said outer skin thereof upon a positional adjustment of said one first or second adjusting element relative to the other said first or second adjusting element.

14. The vehicle body roof region as claimed in claim 13, wherein said at least one retaining portion comprises a plurality of retaining portions disposed adjacent said inner side of said glass roof part, said at least one first adjusting element comprises a plurality of first adjusting elements fixed to said glass roof part adjacent said inner side thereof in spaced-apart relation with one another adjacent outer edge regions of said glass roof part, said at least one second adjusting element comprises a plurality of second adjusting elements disposed between said roof body structure and said glass roof part, and each of said second adjusting elements is movably engaged with one of said first adjusting elements.

15. The vehicle body roof region as claimed in claim 13, wherein said one first or second adjusting element is movably positionally adjustable relative to said other first or second adjusting element to adjust a position of said glass roof part relative to said roof body structure and said outer skin thereof in a substantially vertical direction, and said portion of said second adjusting element is positionally adjustable relative to said at least one retaining portion of said roof body structure to adjust a position of said glass roof part relative to said roof body structure and said outer skin thereof in a substantially horizontal direction.

16. The vehicle body roof region as claimed in claim 13, wherein said at least one second adjusting element is movably positionally adjustable relative to said at least one first adjusting element and has a plate member comprising said portion supported on said at least one retaining portion of said roof body structure on said side thereof in facing relation with said inner side of said glass roof part.

17. The vehicle body roof region as claimed in claim 16, wherein said side of said at least one retaining portion is an upper side and said at least one retaining portion includes a lower side facing away from said upper side, said at least one first adjusting element comprises a downwardly-opening sleeve element and said at least one second adjusting element comprises a spindle element, said spindle element including a first portion threadingly engaged within said sleeve element, a second portion disposed on said lower side of said at least one retaining portion and having a tool contact face, and said plate member is disposed vertically between said first and second portions.

* * * * *